United States Patent
Zhou (10) Patent No.: US 11,440,845 B2
(45) Date of Patent: Sep. 13, 2022

(54) FIREPROOF MATERIAL AND FIREPROOF PLATE, AND FIREPROOF WALL STRUCTURE FOR TUNNEL AND CONSTRUCTION METHOD

(71) Applicant: Luyu Royal Gold Building Materials (Heyuan) Co., Ltd, Guangdong (CN)

(72) Inventor: Guofu Zhou, Guangdong (CN)

(73) Assignee: Luyu Royal Gold Building Materials (Heyuan) Co., Ltd, Heyuan (CN)

( * ) Notice: Subject to any disclaimer, the term of this patent is extended or adjusted under 35 U.S.C. 154(b) by 174 days.

(21) Appl. No.: 16/581,713

(22) Filed: Sep. 24, 2019

(65) Prior Publication Data

US 2020/0017412 A1 Jan. 16, 2020

Related U.S. Application Data

(63) Continuation of application No. PCT/CN2018/099485, filed on Aug. 9, 2018.

(30) Foreign Application Priority Data

Sep. 1, 2017 (CN) .......................... 201710780847.X (51) Int. Cl.
*C04B 28/26* (2006.01)
*B32B 13/04* (2006.01)
(Continued)

(52) U.S. Cl.
CPC ............. *C04B 28/26* (2013.01); *B32B 13/04* (2013.01); *C04B 14/041* (2013.01); *C04B 14/06* (2013.01);
(Continued)

(58) Field of Classification Search
None
See application file for complete search history.

(56) References Cited

U.S. PATENT DOCUMENTS 9,505,972 B2 * 11/2016 Iverson ................... C04B 22/16
10,144,858 B2 * 12/2018 Kennedy ............... C04B 24/425
(Continued)

FOREIGN PATENT DOCUMENTS

| CN | 101054805 A | 10/2007 |
| CN | 201027313 Y | 2/2008 |

(Continued)

OTHER PUBLICATIONS

Written Opinion of the International Search Authority of PCT Patent Application No. PCT/CN2018/099485 dated Oct. 31, 2018.
(Continued)

*Primary Examiner* — John J Figueroa (57) ABSTRACT

Disclosed are a fireproof material, a fireproof plate, a fireproof wall structure for tunnels and a construction method. The fireproof material includes the following components in weight ratio: 20-35 parts of aluminosilicate; 10-25 parts of calcium carbonate; 5-15 parts of magnesium oxide; 5-15 parts of silica; 20-40 parts of a binder; and 5-10 parts of a curing agent, the binder includes at least one of lithium silicate, potassium silicate and sodium silicate in combination with at least one of quartz sand and industrial sugar; and the curing agent is at least one of lithium oxide and magnesium oxide. In the preparation, firstly forming the mixture of aluminosilicate, magnesium oxide and silica into particles at 900° C.-1250° C., and then mixing the particles with calcium carbonate, the binder and the curing agent, and then pouring same into a forming mold and heating and pressing to form the fireproof material.

17 Claims, 8 Drawing Sheets

(51) Int. Cl.

| | | |
|---|---|---|
| *C04B 14/04* | (2006.01) | |
| *C04B 14/06* | (2006.01) | |
| *C04B 14/10* | (2006.01) | |
| *C04B 14/28* | (2006.01) | |
| *C04B 22/06* | (2006.01) | |
| *C04B 24/10* | (2006.01) | |
| *C04B 40/00* | (2006.01) | |
| *C04B 41/00* | (2006.01) | |
| *E04B 1/94* | (2006.01) | |
| *E21D 11/00* | (2006.01) | |
| *E21D 11/08* | (2006.01) | |
| *E21D 11/38* | (2006.01) | |
| *C04B 103/10* | (2006.01) | |
| *C04B 111/00* | (2006.01) | |
| *C04B 111/28* | (2006.01) | |

(52) U.S. Cl.
CPC .......... *C04B 14/104* (2013.01); *C04B 14/28* (2013.01); *C04B 22/062* (2013.01); *C04B 22/066* (2013.01); *C04B 24/10* (2013.01); *C04B 40/0071* (2013.01); *C04B 40/0082* (2013.01); *C04B 41/009* (2013.01); *E04B 1/942* (2013.01); *E21D 11/006* (2013.01); *E21D 11/08* (2013.01); *E21D 11/385* (2013.01); *B32B 2307/3065* (2013.01); *B32B 2419/04* (2013.01); *C04B 2103/10* (2013.01); *C04B 2111/00724* (2013.01); *C04B 2111/28* (2013.01)

(56) References Cited

U.S. PATENT DOCUMENTS

| | | | | |
|---|---|---|---|---|
| 10,351,753 | B2 * | 7/2019 | Agapiou | C09K 8/467 |
| 2016/0289531 | A1 * | 10/2016 | Agapiou | C09K 8/473 |
| 2017/0368668 | A1 * | 12/2017 | Dukes | C04B 35/571 |

FOREIGN PATENT DOCUMENTS

| | | | |
|---|---|---|---|
| CN | 106145864 A | 11/2016 | |
| CN | 207512084 U | 6/2018 | |
| WO | WO-2015094322 A1 * | 6/2015 | ............. C04B 28/12 |

OTHER PUBLICATIONS

International Search Report of PCT Patent Application No. PCT/CN2018/099485 dated Oct. 31, 2018.

* cited by examiner

FIG. 9

FIREPROOF MATERIAL AND FIREPROOF PLATE, AND FIREPROOF WALL STRUCTURE FOR TUNNEL AND CONSTRUCTION METHOD

CROSS REFERENCE TO RELATED APPLICATIONS

This application is a continuation application of PCT/CN2018/099485, filed on Aug. 9, 2018, which claims priority of Chinese patent application No. 201710780847.X filed on Sep. 1, 2017, the contents of the applications are hereby incorporated by reference in their entireties.

TECHNICAL FIELD

The present application relates to the field of fireproof materials, and more particularly to fireproof materials and fireproof plates and to fireproof wall structure for tunnels and construction methods.

BACKGROUND

With the development of science and technology, for various reasons such as transportation convenience, undersea tunnels are built between both sides of bays, and between islands and mainland, such as the Channel Tunnel and the Hong Kong and Macau Zhuhai Tunnel. Due to the special environment of the undersea tunnel, there are often special requirements for the materials used to construct the tunnel. Particularly, the fire resistance and fireproof wall structure of undersea tunnels are especially strict with temperature, humidity and hardness. If the fire resistance is not high enough, in the event of a fire caused by some factors such as a traffic accident, the cooling water sprayed on the concrete wall under high temperature during the rescue process will damage the main body of the building hence affect the life of the tunnel. Even worse, this may cause burst, and the sea water will fall into the tunnel, the consequences are unimaginable.

The Chinese patent "A fireproof protection structure for concrete structures of underwater tunnels" (Patent No.: CN200720069799.5) disclosed a tunnel fireproof plate, including a tunnel concrete member and a fireproof plate, a hanging element is mounted on the tunnel concrete members, and the fireproof plate is fixed on the surface of the tunnel concrete member via the hanging element. The disadvantages of fixing the fireproof plate in the tunnel using the hanging element are that it is prone to aging and falling off, it has short life span, and continuous maintenance is needed for the falling fireproof plate during use.

In addition, some existing tunnels are coated with a layer of fireproof coating on the concrete surface, which has poor fireproofing effect and short life span and is easy to fall off.

Therefore, a high temperature refractory material and a fireproof plate thereof suitable for tunnels are considered.

SUMMARY OF THE APPLICATION

An objective of the present application is to provide a fireproof material and a fireproof plate, and a fireproof wall structure for tunnels and construction method to overcome the deficiencies of the prior art.

To achieve the above objective, a technical proposal of the present application is:

A fireproof material includes the following components in weight ratio:

Aluminosilicate: 20-35 parts;
Calcium carbonate: 10-25 parts;
Magnesium oxide: 5-15 parts;
Silica: 5-15 parts;
Binder: 20-40 parts;
Curing agent: 5-10 parts;

Wherein the component of the binder is at least one of lithium silicate, potassium silicate, and sodium silicate mixed with at least one of quartz sand and industrial sugar; and the component of the curing agent is at least one of lithium oxide and magnesium oxide; the mixture of aluminosilicate, magnesium oxide and silica forms particles with diameters of 0.5-8 mm at 900° C.-1250° C.; the above-mentioned particles are then mixed with calcium carbonate, the binder and the curing agent, and then poured into a forming mold, heated and pressed to form the material.

A further technical proposal is: further includes bentonite, which is 5-10 parts in weight ratio;

A further technical proposal is: wherein, when the binder is a mixture of lithium silicate and industrial sugar, the components in weight ratio are:

Lithium silicate: 15-25 parts;
Industrial sugar: 5-10 parts;

Or when the components of the binder are lithium silicate and quartz sand, the components in weight ratio are:

Lithium silicate: 15-25 parts;
Quartz sand: 5-10 parts;

Or when the components of the binder are mixture of potassium silicate and industrial sugar, the components in weight ratio are:

Potassium silicate: 15-25 parts;
Industrial sugar: 5-10 parts;

Or when the components of the binder are mixture of potassium silicate and quartz sand, the components in weight ratio are:

Potassium silicate: 15-25 parts;
Quartz sand: 5-10 parts;

Or when the components of the binder are mixture of sodium silicate and quartz sand, the components in weight ratio are:

Sodium silicate: 15-25 parts;
Quartz sand: 5-10 parts;

Or when the components of the binder are mixture of sodium silicate and industrial sugar, the components in weight ratio are:

Sodium silicate: 15-25 parts;
Industrial sugar: 5-10 parts;

Or when the components of the binder are mixture of lithium silicate, potassium silicate and industrial sugar, the components in weight ratio are:

Lithium silicate: 5-12 parts;
Potassium silicate: 5-13 parts;
Industrial sugar: 5-10 parts;

Or when the components of the binder are mixture of lithium silicate, sodium silicate and industrial sugar, the components in weight ratio are:

Lithium silicate: 5-12 parts;
Sodium silicate: 5-13 parts; potassium silicate, sodium silicate
Industrial sugar: 5-10 parts;

Or when the components of the binder are mixture of potassium silicate, sodium silicate and industrial sugar, the components in weight ratio are:

Potassium silicate: 5-13 parts;
Sodium silicate: 5-12 parts;
Industrial sugar: 5-10 parts;

Or when the components of the binder are mixture of lithium silicate, potassium silicate and industrial sugar, the components in weight ratio are:
Lithium silicate: 5-13 parts;
Potassium silicate: 5-12 parts;
Quartz sand: 5-10 parts;
Or when the components of the binder are mixture of lithium silicate, sodium silicate and industrial sugar, the components in weight ratio are:
Lithium silicate: 5-12 parts;
Sodium silicate: 5-13 parts;
Quartz sand: 5-10 parts;
Or when the components of the binder are mixture of potassium silicate, sodium silicate and industrial sugar, the components in weight ratio are:
Potassium silicate: 5-13 parts;
Sodium silicate: 5-12 parts;
Quartz sand: 5-10 parts;
Or when the components of the binder are mixture of lithium silicate, potassium silicate, sodium silicate and quartz sand, industrial sugar, the components in weight ratio are:
Lithium silicate: 4-8 parts;
Potassium silicate: 3-8 parts;
Sodium silicate: 2-7 parts;
Quartz sand: 4-6 parts;
Industrial sugar: 2-4 parts;
Or when the components of the curing agent are mixture of lithium oxide and magnesium oxide, the components in weight ratio are:
Lithium oxide 1-4 parts;
Magnesium oxide 4-6 parts;

A further technical proposal is: the particles have diameters of 0.5-8 mm; and the particles with calcium carbonate, the binder and the curing agent are pressurized to 31-44 MPa in a mold cavity at a temperature of 180° C.-245° C. and held for 35-55 minutes.

A fireproof plate includes a plate body, wherein the plate body is made of the fireproof material described above; and the plate body is provided with an enamel layer on one side or both sides.

A further technical proposal is that the thickness of the plate body is 5-50 mm; the thickness of the enamel layer is 0.1-5 mm; and the enamel layer is sintered at a temperature of 400-1000° C.

A fireproof wall structure applied to tunnels includes a wall, the above-mentioned fireproof plate, and a connecting member for fixing the fireproof plate to the wall.

A further technical proposal is: the connecting member includes a first connecting portion, a second connecting portion and a third connecting portion that are sequentially coupled, and the first connecting portion, the second connecting portion and the third connecting portion form a groove structure; the first connecting portion is fixedly coupled to the fireproof plate, and the third connecting portion is fixedly coupled to the wall; the first connecting portion is provided with a clearance slot, and the third connecting portion is fixedly coupled to the fixing member provided on the wall by the clearance slot.

A further technical proposal is: a plurality of adhesives are uniformly distributed between the fireproof plate and the wall.

A method of constructing a fireproof wall structure for tunnels, including installing the fixing member on the wall, and fixedly coupling the connecting member to the fixing member; then adhering the adhesive to the wall or the fireproof plate to fix the fireproof plate to the surface of the wall. Finally, fixedly coupling the fireproof plate to the connecting member by using a fastener provided, and filling fireproof sealant between a plurality of the fireproof plates.

The beneficial effects of the present application compared to the prior art are: the present application produces the fireproof material as follows: mixing aluminosilicate, magnesium oxide and silicon oxide so that the mixture forms particles with diameters of 0.5-8 mm at 900° C.-1250° C.; then mixing the particles with calcium carbonate, the binder and the curing agent, and pouring same into a forming mold pressurized to 31-44 MPa at 180° C.-245° C. in a cavity and holding for 35-55 minutes. The fireproof material can be made into a fireproof plate, and the fireproof plate can be used for a fireproof wall structure of undersea tunnels. The fireproof plate is fixedly coupled to the inner wall of the tunnel via a groove-type connecting member to form a fireproof wall structure. The fireproof plate of the present application has the advantages of high strength, low density, high temperature resistance, strong corrosion resistance, strong plasticity and no staining, and meets the requirements of being waterproof, fireproof, heat insulating and self-cleaning of the tunnel, it also has characteristics of a long service life, being not easy to fall off, environment-friendly, low carbon, energy saving and renewable.

The present application is further described below in conjunction with the accompanying drawings and detailed embodiments.

DESCRIPTION OF THE EMBODIMENTS

In order to more fully understand the technical content of the present application, the technical proposals of the present application are further described and illustrated in conjunction with the detailed embodiments, but are not limited thereto.

FIGS. 1 to 9 are drawings of the present application.

The present application relates to a fireproof material which includes the following components in weight ratio:
Aluminosilicate: 20-35 parts;
Calcium carbonate: 10-25 parts;
Magnesium oxide: 5-15 parts;
Silica: 5-15 parts;
Binder: 20-40 parts;
Curing agent: 5-10 parts;
Bentonite: 5-10 parts;

Wherein the component of the binder is at least one of lithium silicate, potassium silicate, and sodium silicate mixed with at least one of quartz sand and industrial sugar; and the component of the curing agent is at least one of lithium oxide and magnesium oxide; the mixture of aluminosilicate, magnesium oxide and silica forms particles with diameters of 0.5-8 mm at 900° C.-1250° C.; the above-mentioned particles are mixed with calcium carbonate, the binder and the curing agent, then poured into a forming mold to be heated and pressed to form the material. The material further includes bentonite, which in weight ratio is 5-10 parts.

Wherein, when the binder is a mixture of lithium silicate and industrial sugar, the components in weight ratio are:
Lithium silicate: 15-25 parts;
Industrial sugar: 5-10 parts;
Or when the components of the binder are lithium silicate and quartz sand, the components in weight ratio are:
Lithium silicate: 15-25 parts;
Quartz sand: 5-10 parts;
Or when the components of the binder are mixture of potassium silicate and industrial sugar, the components in weight ratio are:
Potassium silicate: 15-25 parts;
Industrial sugar: 5-10 parts;
Or when the components of the binder are mixture of potassium silicate and quartz sand, the components in weight ratio are:
Potassium silicate: 15-25 parts;
Quartz sand: 5-10 parts;
Or when the components of the binder are mixture of sodium silicate and quartz sand, the components in weight ratio are:
Sodium silicate: 15-25 parts;
Quartz sand: 5-10 parts;
Or when the components of the binder are mixture of sodium silicate and industrial sugar, the components in weight ratio are:
Sodium silicate: 15-25 parts;
Industrial sugar: 5-10 parts;
Or when the components of the binder are mixture of lithium silicate, potassium silicate and industrial sugar, the components in weight ratio are:
Lithium silicate: 5-12 parts;
Potassium silicate: 5-13 parts;
Industrial sugar: 5-10 parts;
Or when the components of the binder are mixture of lithium silicate, sodium silicate and industrial sugar, the components in weight ratio are:
Lithium silicate: 5-12 parts;
Sodium silicate: 5-13 parts;
Industrial sugar: 5-10 parts;
Or when the components of the binder are mixture of potassium silicate, sodium silicate and industrial sugar, the components in weight ratio are:
Potassium silicate: 5-13 parts;
Sodium silicate: 5-12 parts;
Industrial sugar: 5-10 parts;
Or when the components of the binder are mixture of lithium silicate, potassium silicate and quartz sand, the components in weight ratio are:
Lithium silicate: 5-13 parts;
Potassium silicate: 5-12 parts;
Quartz sand: 5-10 parts;
Or when the components of the binder are mixture of lithium silicate, sodium silicate and quartz sand, the components in weight ratio are:
Lithium silicate: 5-12 parts;
Sodium silicate: 5-13 parts;
Quartz sand: 5-10 parts;
Or when the components of the binder are mixture of potassium silicate, sodium silicate and quartz sand, the components in weight ratio are:
Potassium silicate: 5-13 parts;
Sodium silicate: 5-12 parts;
Quartz sand: 5-10 parts;
Or when the components of the binder are mixture of lithium silicate, potassium silicate, sodium silicate and quartz sand, industrial sugar, the components in weight ratio are:
Lithium silicate: 4-8 parts;
Potassium silicate: 3-8 parts;
Sodium silicate: 2-7 parts;
Quartz sand: 4-6 parts;
Industrial sugar: 2-4 parts;
Or when the components of the curing agent are mixture of lithium oxide and magnesium oxide, the components in weight ratio are:
Lithium oxide 1-4 parts;
Magnesium oxide 4-6 parts.

The material is fabricated by pressing the particles with calcium carbonate, the binder and the curing agent in a cavity pressurized to 31-44 MPa at a temperature of 180° C.-245° C. and held for 35-55 minutes, and its density is 500-650 kg/m$^3$.

Preferably, the forming temperature may be 1800-2200° C. in order for the aluminosilicate, the magnesium oxide and the alumina to be more sufficiently mixed, and they may be formed at a pressure of 30-60 MPa.

Embodiment 1

Made by mixing components with following weights:
The mixture of aluminosilicate, magnesium oxide and silica forms 42 Kg of particles at 980° C.; 15 Kg of calcium carbonate;
25 Kg of binder, which is lithium silicate and quartz sand (where sodium silicate is 20 Kg, quartz sand is 5 Kg);
8 Kg of curing agent, which is magnesium oxide and lithium oxide (where lithium silicate is 5 Kg, lithium oxide is 3 Kg).
The forming pressure is 35 MPa, the forming time is 30 minutes, and the temperature is 215° C. After testing, the final fireproof and heat-insulating material formed has a density of 560 kg/m$^3$.

Embodiment 2

Made by mixing components with following weights:
The mixture of aluminosilicate, magnesium oxide and silica forms 48 Kg of particles at 1080° C.; 16 Kg of calcium carbonate;
28 Kg of binder, which is lithium silicate and industrial sugar (where sodium silicate is 20 Kg, industrial sugar is 8 Kg);
8 Kg of curing agent, which is magnesium oxide and lithium oxide (where lithium silicate is 5 Kg, lithium oxide is 3 Kg).
The forming pressure is 35 MPa, the forming time is 30 minutes, and the temperature is 235° C. After testing, the final fireproof and heat-insulating material formed has a density of 550 kg/m$^3$.

Embodiment 3

Made by mixing components with following weights:

The mixture of aluminosilicate, magnesium oxide and silica forms 50 Kg of particles at 1000° C.; 16 Kg of calcium carbonate;

28 Kg of binder, which is mixture of potassium silicate and industrial sugar (where potassium silicate is 20 Kg, industrial sugar is 8 Kg);

8 Kg of curing agent, which is magnesium oxide and lithium oxide (where lithium silicate is 5 Kg, lithium oxide is 3 Kg).

The forming pressure is 35 MPa, the forming time is 30 minutes, and the temperature is 235° C. After testing, the final fireproof and heat-insulating material formed has a density of 550 kg/m$^3$.

Embodiment 4

Made by mixing components with following weights:

The mixture of aluminosilicate, magnesium oxide and silica forms 40 Kg of particles at 1100° C.; 16 Kg of calcium carbonate;

28 Kg of binder, which is mixture of potassium silicate and quartz sand (where potassium silicate is 20 Kg, quartz sand is 8 Kg);

9 Kg of curing agent, which is magnesium oxide and lithium oxide (where lithium silicate is 5 Kg, lithium oxide is 4 Kg).

The forming pressure is 38 MPa, the forming time is 45 minutes, and the temperature is 230° C. After testing, the final fireproof and heat-insulating material formed has a density of 550 kg/m$^3$.

Embodiment 5

Made by mixing components with following weights:

The mixture of aluminosilicate, magnesium oxide and silica forms 55 Kg of particles at 1000° C.; 19 Kg of calcium carbonate;

30 Kg of binder, which is mixture of sodium silicate and quartz sand (where sodium silicate is 20 Kg, quartz sand is 10 Kg);

8 Kg of curing agent, which is magnesium oxide and lithium oxide (where lithium silicate is 4 Kg, lithium oxide is 4 Kg).

The forming pressure is 40 MPa, the forming time is 45 minutes, and the temperature is 240° C. After testing, the final fireproof and heat-insulating material formed has a density of 580 kg/m$^3$.

Embodiment 6

Made by mixing components with following weights:

The mixture of aluminosilicate, magnesium oxide and silica forms 45 Kg of particles at 1050° C.; 16 Kg of calcium carbonate;

28 Kg of binder, which is mixture of lithium silicate, potassium silicate and industrial sugar (where lithium silicate is 10 Kg, potassium silicate is 10 Kg, industrial sugar is 8 Kg); 8 Kg of bentonite;

8 Kg of curing agent, which is magnesium oxide and lithium oxide (where lithium silicate is 4 Kg, lithium oxide is 4 Kg).

The forming pressure is 45 MPa, the forming time is 44 minutes, and the temperature is 245° C. After testing, the final fireproof and heat-insulating material formed has a density of 610 kg/m$^3$.

Embodiment 7

Made by mixing components with following weights:

The mixture of aluminosilicate, magnesium oxide and silica forms 45 Kg of particles at 1100° C.; 16 Kg of calcium carbonate;

35 Kg of binder, which is mixture of potassium silicate, sodium silicate, and industrial sugar (where potassium silicate is 13 Kg, sodium silicate is 12 Kg, industrial sugar is 10 Kg); 10 Kg of bentonite;

8 Kg of curing agent, which is magnesium oxide and lithium oxide (where lithium silicate is 3 Kg, lithium oxide is 5 Kg).

The forming pressure is 40 MPa, the forming time is 45 minutes, and the temperature is 240° C. After testing, the final fireproof and heat-insulating material formed has a density of 630 kg/m$^3$.

Embodiment 8

Made by mixing components with following weights:

The mixture of aluminosilicate, magnesium oxide and silica forms 50 Kg of particles at 1200° C.; 18 Kg of calcium carbonate;

35 Kg of binder, which is mixture of lithium silicate, sodium silicate and quartz sand (where lithium silicate is 13 Kg, sodium silicate is 12 Kg, quartz sand is 10 Kg); 10 Kg of bentonite;

8 Kg of curing agent, which is magnesium oxide and lithium oxide (where lithium silicate is 3 Kg, lithium oxide is 5 Kg).

The forming pressure is 40 MPa, the forming time is 45 minutes, and the temperature is 235° C. After testing, the final fireproof and heat-insulating material formed has a density of 635 kg/m$^3$.

Embodiment 9

Made by mixing components with following weights:

The mixture of aluminosilicate, magnesium oxide and silica forms 40 Kg of particles at 1250° C.; 20 Kg of calcium carbonate;

35 Kg of binder, which is mixture of lithium silicate, potassium silicate and quartz sand (where lithium silicate is 13 Kg, potassium silicate is 12 Kg, quartz sand is 10 Kg); 10 Kg of bentonite;

8 Kg of curing agent, which is magnesium oxide and lithium oxide (where lithium silicate is 3 Kg, lithium oxide is 5 Kg).

The forming pressure is 40 MPa, the forming time is 45 minutes, and the temperature is 235° C. After testing, the final fireproof and heat-insulating material formed has a density of 635 kg/m$^3$.

Embodiment 10

Made by mixing components with following weights:

The mixture of aluminosilicate, magnesium oxide and silica forms 40 Kg of particles at 1200° C.; 20 Kg of calcium carbonate;

35 Kg of binder, which is mixture of lithium silicate, potassium silicate, sodium silicate and quartz sand, industrial sugar (where lithium silicate is 5 Kg, potassium silicate is 8 Kg, sodium silicate is 7 Kg, quartz sand is 6 Kg, industrial sugar is 4 Kg); 10 Kg of bentonite;

8 Kg of curing agent, which is magnesium oxide and lithium oxide (where lithium silicate is 3 Kg, lithium oxide is 5 Kg).

The forming pressure is 40 MPa, the forming time is 50 minutes, and the temperature is 235° C. After testing, the final fireproof and heat-insulating material formed has a density of 640 kg/m$^3$.

Embodiment 11

Made by mixing components with following weights:

The mixture of aluminosilicate, magnesium oxide and silica forms 38 Kg of particles at 1200° C.; 20 Kg of calcium carbonate;

35 Kg of binder, which is mixture of lithium silicate and industrial sugar (where lithium silicate is 25 Kg, industrial sugar is 10 Kg); 10 Kg of bentonite;

8 Kg of curing agent, which is magnesium oxide (where magnesium oxide is 8 Kg).

The forming pressure is 40 MPa, the forming time is 50 minutes, and the temperature is 235° C. After testing, the final fireproof and heat-insulating material formed has a density of 630 kg/m$^3$.

The burning behavior of the fireproof material of the present application all reaches A1 grade, and the thermal conductivity is 0.035-0.0664 W/(m·k) (25° C.). The compressive strength of each embodiment is 630-680 KPa, and the tensile strength is 100-150 KPa. As can be seen from the above embodiments, since the density of the particles is small, even if the amount thereof is increased, the density of the material of the present application does not increase too much; while the density of the particles is moderate, and the density of the binder is large, if the their amount is increased, it will result in an increase in the density of the material of the present application. Bentonite was added in the above embodiments 8, 9 and 10. The bentonite is characterized by strong cohesive force, high plasticity, good demolding effect, excellent gas permeability, and stable physical and chemical properties under high-temperature and high-humidity conditions. Moreover, the most important characteristic of bentonite is good heat resistance. It retains its characteristic viscosity even at high temperatures. Therefore, when the fireproof and heat insulating material of the present application is used as the material of a fireproof plate, it has the advantages of low density, high compressive strength, high tensile strength, good plasticity and strong fire resistance.

Figure 1:
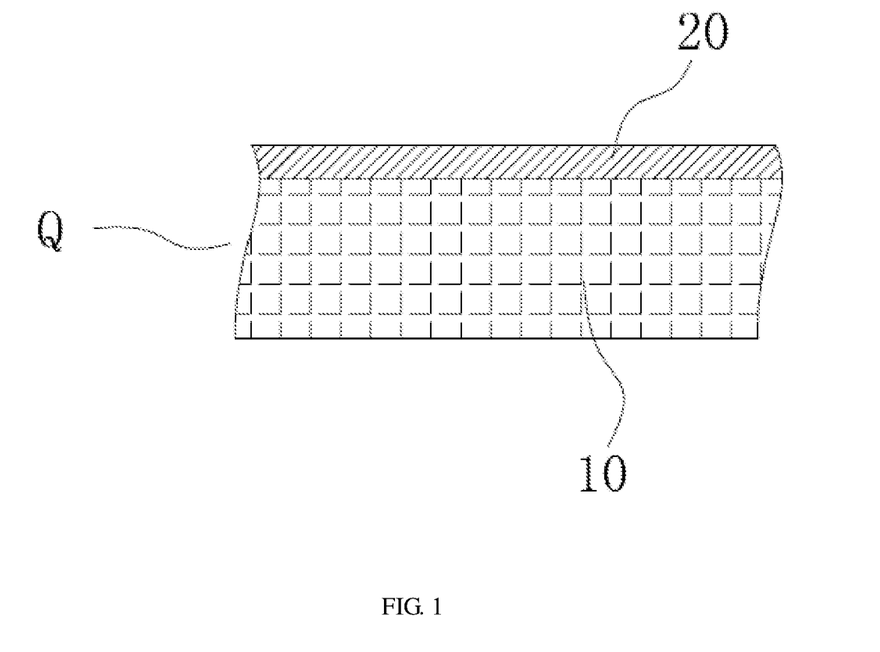
FIG. 1 is a schematic structural view of an embodiment of a fireproof plate according to the present application.
Figure 2:
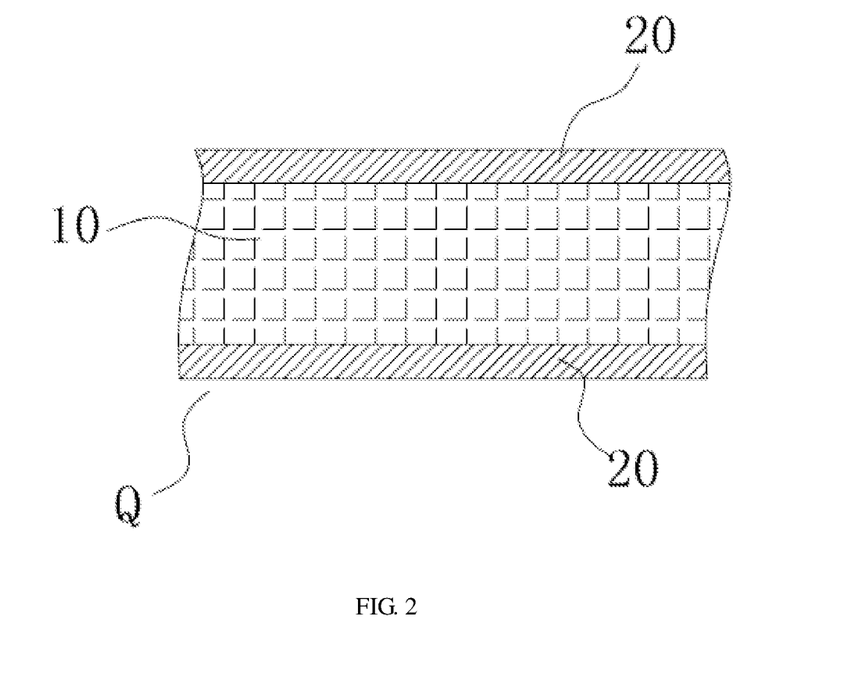
FIG. 2 is a schematic structural view of an embodiment of a fireproof plate according to the present application.

A fireproof plate Q, as shown in FIGS. 1 and 2, includes a plate body 10 which comprises of the above-mentioned fireproof material, and an enamel layer 20 is provided outside the plate body 10. Wherein the enamel layer 20 can withstand high temperature to be fireproof; and the surface of the enamel layer 20 is smooth so that dust and other impurities will fall off, enabling it to be self-cleaning. The plate body 10 is pressed into a suitable plate body from the above-mentioned fireproof material, and then the enamel layer 20 is sintered on one side or both sides of the plate body 10.

Preferably, the thickness of the plate body is 5-50 mm.

Preferably, the thickness of the enamel layer 20 is 0.1-5 mm. The enamel layer 20 is sintered at a temperature of 400-1000° C.

In other embodiments, the enamel layer 20 may also be sintered on both sides of the plate body 10.

The above-mentioned lightweight fireproof plate is often used in the fireproof wall structure of tunnels, especially undersea tunnels. Of course, it is also applicable to other fireproof wall structures, such as indoor walls, exterior walls of buildings, or other areas where fire protection is required. Due to the low density, the fireproof plate with the same volume is lighter, easy to install, and convenient for transportation and storage.

The fireproof wall structure applied to tunnels, as shown in FIGS. 3 to 9, includes wall 40, the above-mentioned fireproof plate Q and the connecting member 30 for fixing the fireproof plate Q to the wall 40.

Figure 5:
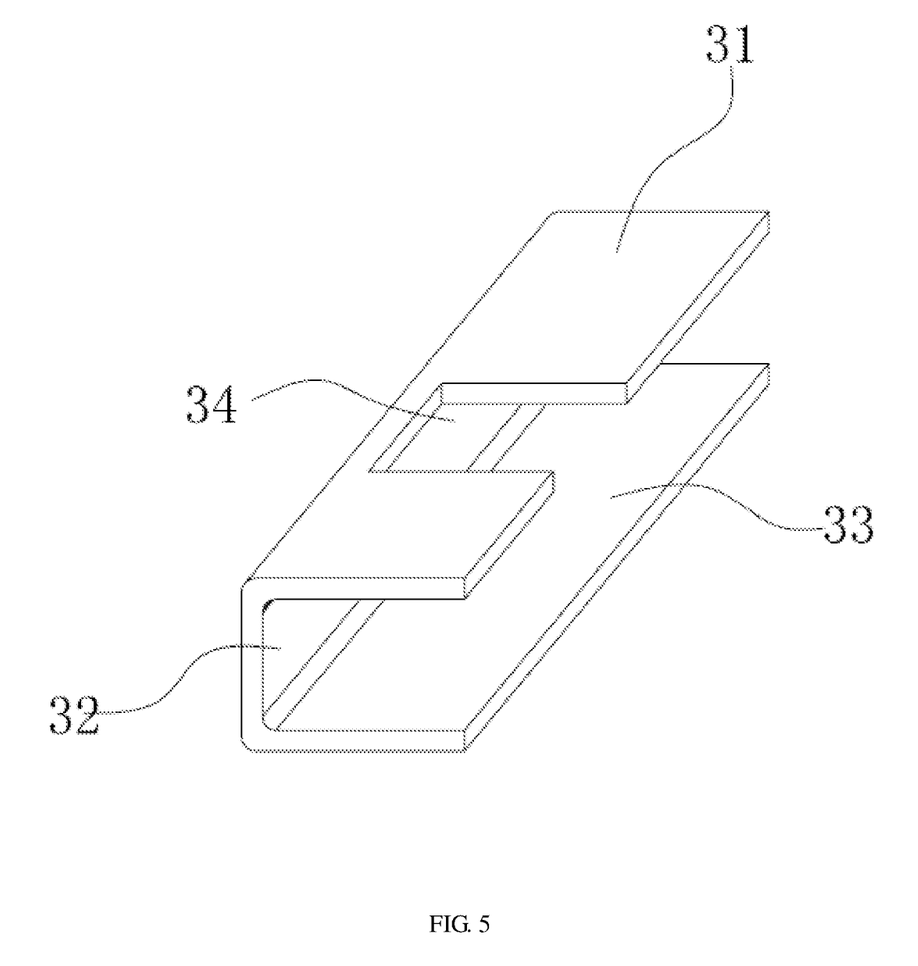
FIG. 5 is a perspective structural view of a connecting member of an embodiment of a fireproof wall structure for tunnels according to the present application.

The connecting member 30 includes a first connecting portion 31, a second connecting portion 32 and a third connecting portion 33 that are sequentially coupled, and the first connecting portion 31, the second connecting portion 32 and the third connecting portion 33 constitute a groove structure. The first connecting portion 31 is fixedly coupled to the fireproof plate, and the third connecting portion 33 is fixedly coupled to the wall. The first connecting portion 31 is provided with a clearance slot 34, and the third connecting portion 33 is fixedly coupled to a fixing member provided on the wall via the clearance slot 34.

Figure 4:
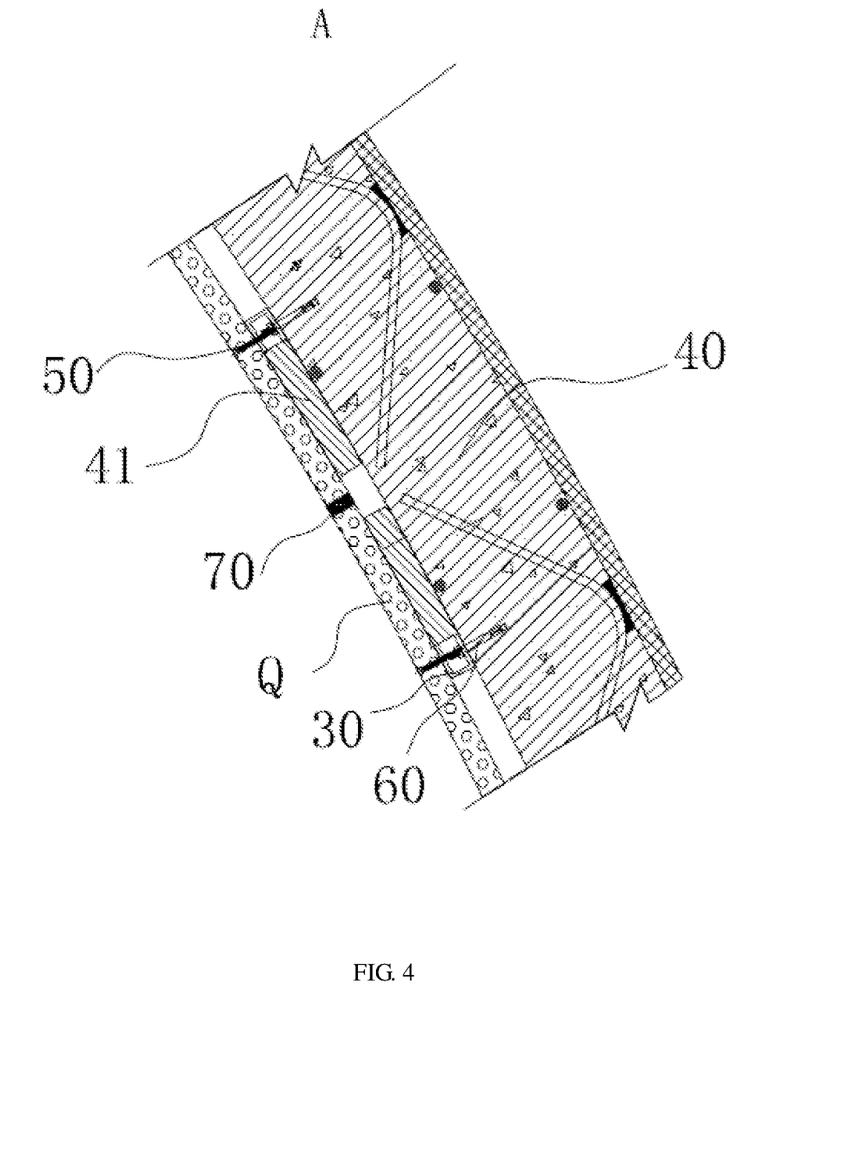
FIG. 4 is a partial enlarged view of part A of FIG. 3.

Specifically, the fireproof plate Q is fixedly coupled to the first connecting portion 31 by a fastening screw 50. The fastening screw 50 is a countersunk screw which is directly fixed to the first connecting portion 31 penetrating through the fireproof plate Q. The fixing member 60 is an expansion bolt. During the installation process, the expansion bolt is first fixed on the wall 40, and then the connecting member is fastened to the expansion bolt by a nut. The function of the clearance slot 34 is to facilitate a wrench or sleeve to tighten the nut. Moreover, the expansion bolt and nut are both located inside the groove structure.

At the same time, the clearance slot 34 can also serve as a mounting location for mounting the expansion bolt. Specifically, the connecting member 30 can be installed from the side of the expansion bolt, and the connecting member 30 and the expansion bolt are fixedly coupled by a nut and a gasket.

Figure 9:
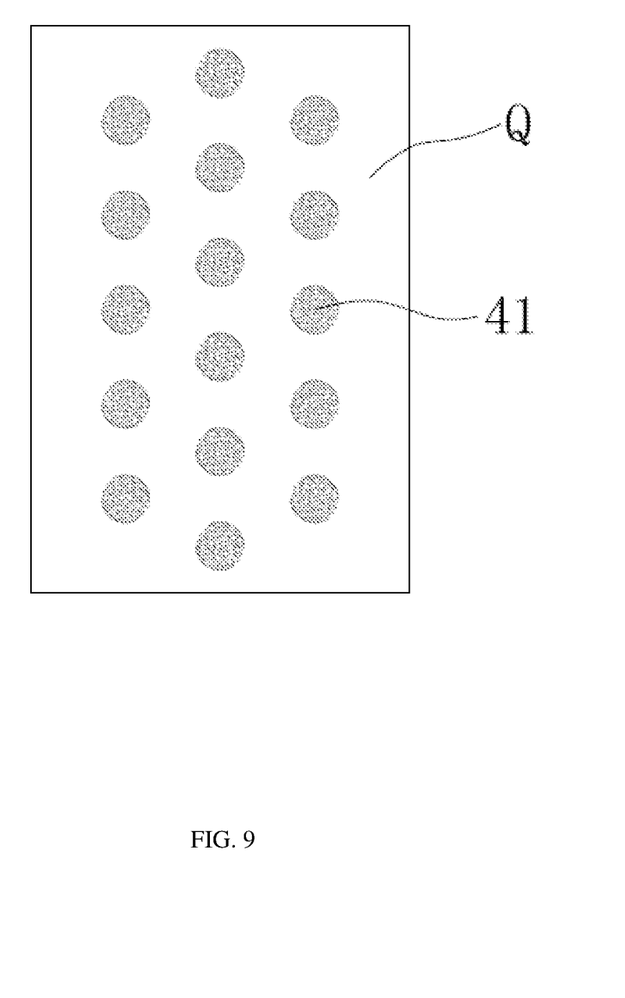
FIG. 9 is a schematic view of the installation of a fireproof plate and binders of an embodiment of a fireproof wall structure for tunnels according to the present application.

For the convenience of installation and the reliability of the installation of the fireproof plate Q, a plurality of adhesives 41 are disposed between the fireproof plate Q and the wall 40. The adhesive 41 is mortar, concrete, or the like. Preferably, the two adjacent adhesives 41 are arranged at intervals such that, in the fastening of the fireproof plate Q, there is sufficient space for accommodating the deformation of the adhesive 41 to prevent the adhesive 41 from being poured into the connecting member 30. At the same time, the adhesives 41 are spaced at intervals to facilitate disassembly in the later maintenance.

Figure 3:
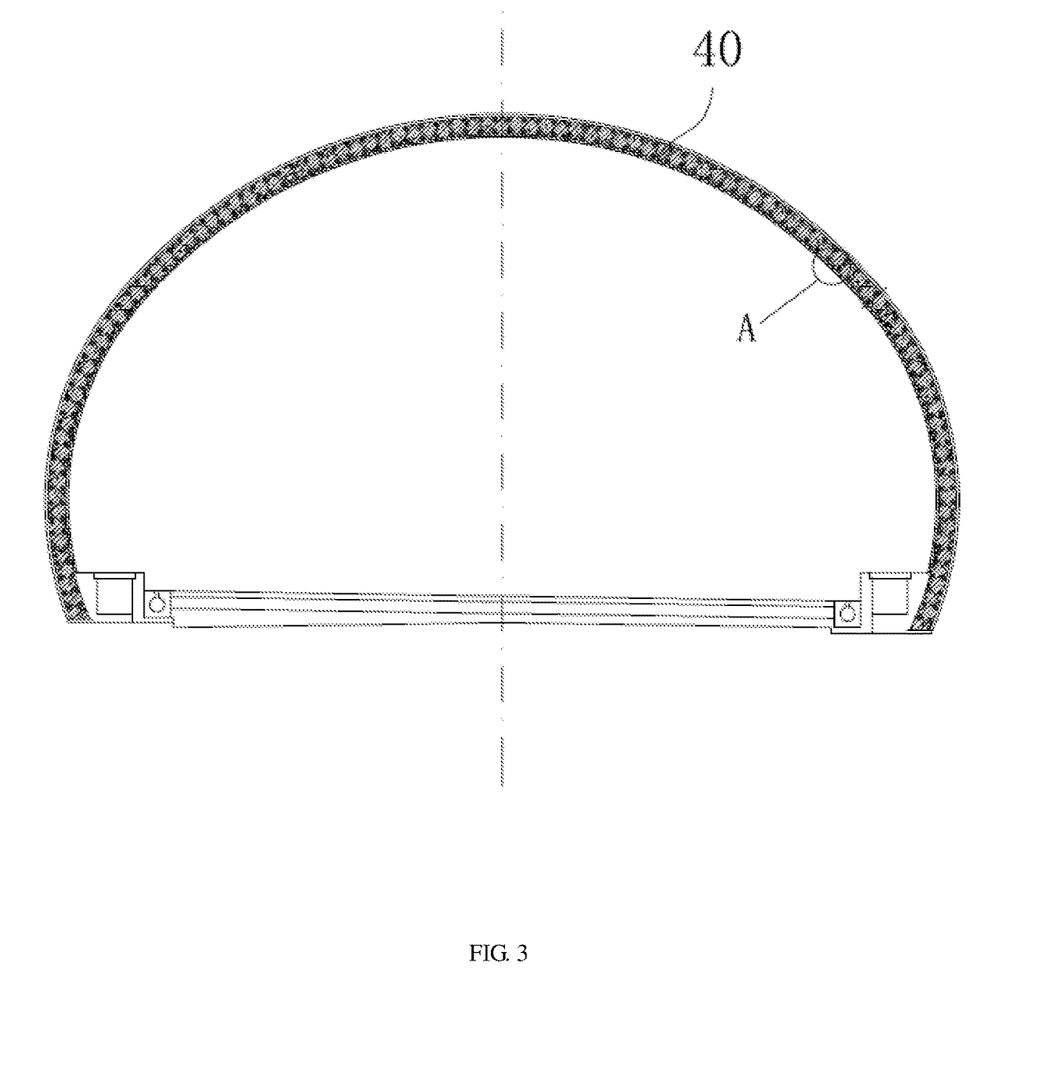
FIG. 3 is a fireproof wall structure with a arc-shaped wall surface of an embodiment of a fireproof wall structure for tunnels according to the present application.
Figure 6:
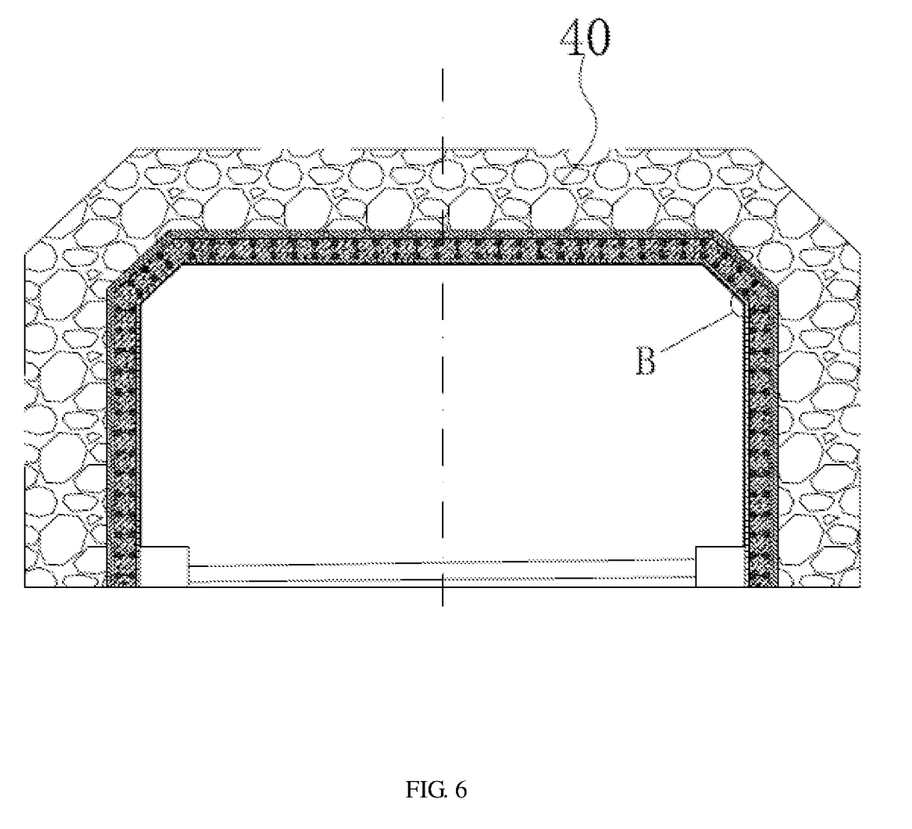
FIG. 6 is a fireproof wall structure with a flat wall surface of an embodiment of a fireproof wall structure for tunnels according to the present application.
Figure 7:
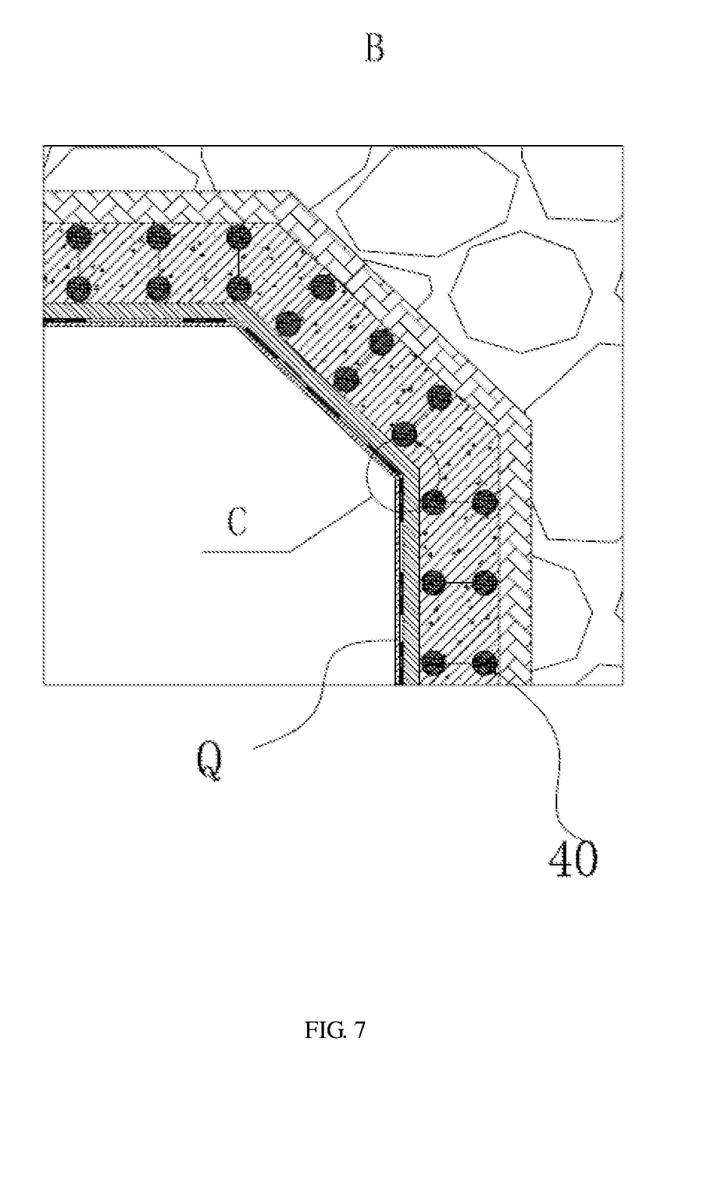
FIG. 7 is a partial enlarged view of part B of FIG. 6.
Figure 8:
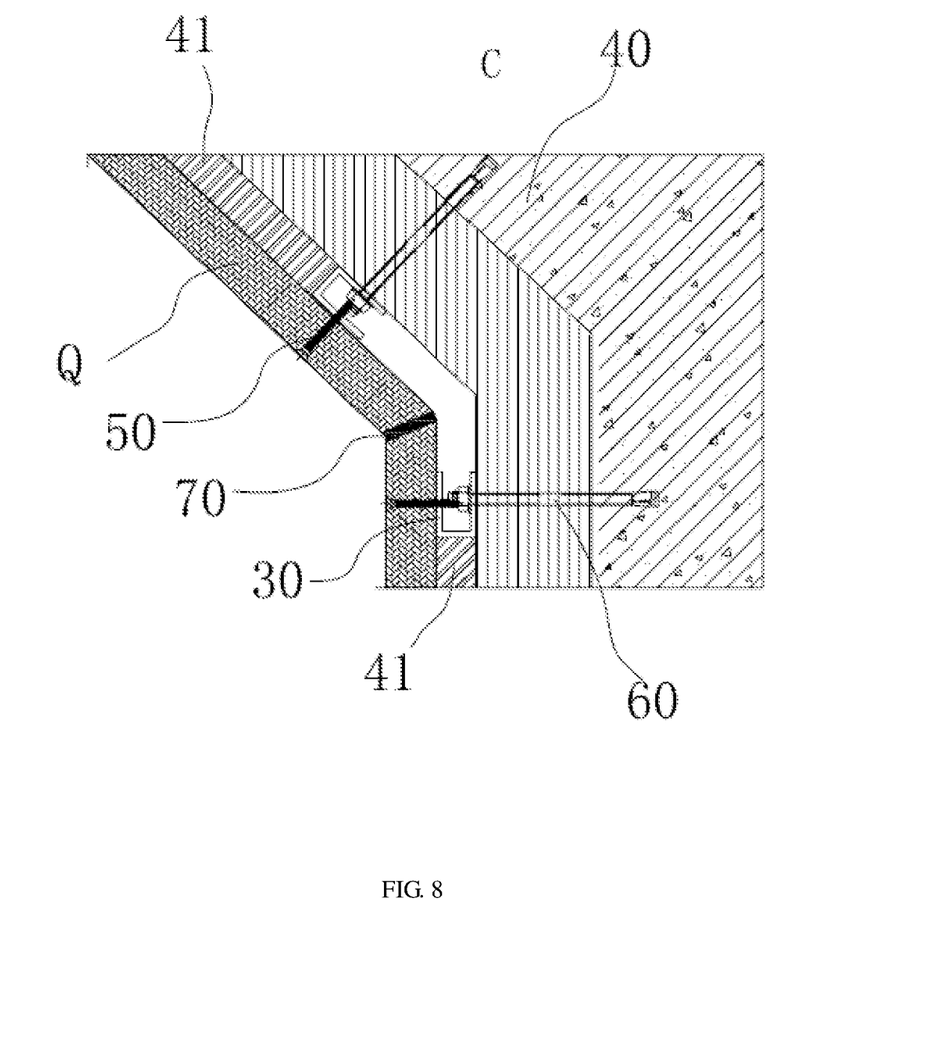
FIG. 8 is a partial enlarged view of part C of FIG. 7.

Wherein, the wall 40 is an arc wall or a plane wall; when the wall 40 is an arc wall, the fireproof plate Q is an arc structure. By joining a plurality of arc-shaped fireproof plates Q, a fireproof plate layer whose radian matches to that of the arc wall is formed. When the wall 40 is a flat wall, the fireproof panel Q is a straight structure. Preferably, in order to make a more compact fireproof wall structure and better fireproofing effect, the sealant 70 is disposed between the fireproof plates Q. Preferably, the sealant 70 is an adhesive having a fire-resisting rating of grade A.

If the wall 40 is a flat wall, the corner of the wall 40 is an oblique-angle transition. Therefore, the end surfaces of the two adjacent fireproof plates Q at the oblique-angle transition are provided with slope faces to make the two fireproof plates Q seamlessly connected during the joining process.

The fireproof plate of the present application can be applied to the fireproof wall structure of the outer wall or the inner wall of various building structures; the shape thereof can be changed according to the shape of the outer wall or the inner wall. The shape and size of the fireproof plate can be manufactured according to the shape of the building wall into a special shape and size. Since the original surface of the body of each building wall is not necessarily a complete flat surface, a leveling layer is required for some walls (the leveling material should be made of flexible water-resistant putty). The specific requirements are as follows: (1) In addition to the aerated concrete wall, the outer side of the base wall may have a cement mortar leveling layer, and the bonding strength should meet the relevant requirements, and the thickness of the cement mortar leveling layer can be determined based on the flatness of the base wall surface, but should not be less than 12 mm; (2) When the base wall is a concrete wall, autoclaved lime sand brick and silicate brick masonry, a concrete interface agent may be used as an interface layer between the base wall layer and the cement mortar leveling layer; (3) when the base wall is an aerated concrete masonry or exterior wall, the surface may be coated with a special interface agent; and a thin layer of cement mortar leveling layer with a thickness of 10 mm may be applied after the special interface agent coating.

A method of constructing a fireproof wall structure for tunnels, including installing the fixing member 60 on the wall 40, and fixedly coupling the connecting member 30 to the fixing member 60; then adhering the adhesive 41 to the wall 40 or the fireproof plate Q to fix the fireproof plate Q to the surface of the wall 40; finally, fixedly coupling the fireproof plate Q to the connecting member 30 by using the fasteners provided, and filling the fireproof plates Q with the fireproof sealant 70 therebetween. Wherein, the adhesive 41 needs to have a short solidification time, a strong bonding force, and good plasticity, so that to facilitate the pre-fixing of the fireproof plate Q during the installation process.

The present application forms particles from the mixture of aluminosilicate, magnesium oxide and silica at 900° C.-1250° C., and the diameters of the particles are 0.5-8 mm; the particles are mixed with calcium carbonate, the binder and the curing agent, and are poured into a forming mold pressurized to 31-44 MPa in the cavity at a temperature of 180° C.-245° C. and held for 35-55 minutes to form the fireproof material. The fireproof material can be made into a fireproof plate, and the fireproof plate can be used for a fireproof wall structure of undersea tunnels. The fireproof plate is fixedly coupled to the inner wall of the tunnel by a groove-shaped connecting member to form a fireproof wall structure. The fireproof plate of the present application has the advantages of high strength, low density, high temperature resistance, strong corrosion resistance, high plasticity and no staining, meeting the requirements of waterproof, fireproof, heat insulation and self-cleaning of the tunnel, and it is characterized by long service life, being not easy to fall off, environment-friendly, low carbon, energy saving and renewable.

The above examples merely further illustrate the technical details of the present application, in order to facilitate easier understanding of the reader, but do not represent embodiments of the present application is limited thereto, any extension or re-creation made under this application falls into the protection of this application.

What is claimed is:

1. A fireproof material, characterized in that the material comprises the following components in weight ratio:
   20-35 parts of aluminosilicate;
   10-25 parts of calcium carbonate;
   5-15 parts of magnesium oxide;
   5-15 parts of silica;
   20-40 parts of binder;
   5-10 parts of curing agent;
   wherein the binder is a mixture of lithium silicate, sodium silicate and industrial sugar; and the curing agent is at least one of lithium oxide and magnesium oxide; a mixture of the aluminosilicate, the magnesium oxide and the silica forms into particles at 900° C.-1250° C.; the particles are mixed with the calcium carbonate, the binder and the curing agent, poured into a forming mold, heated and pressed to form the material.

2. The fireproof material according to claim 1, further comprising 5-10 parts of bentonite in weight ratio.

3. The fireproof material according to claim 1, wherein the binder is a mixture of the following components in weight ratio based on the total weight of the fireproof material:
   5-12 parts of lithium silicate;
   5-13 parts of sodium silicate; and
   5-10 parts of industrial sugar.

4. The fireproof material according to claim 1, wherein the particles have a diameter of 0.5-8 mm; and the particles with the calcium carbonate, the binder and the curing agent are pressurized to 31-44 MPa in a mold cavity at a temperature of 180° C.-245° C. and held for 35-55 minutes to form the material.

5. A fireproof plate comprising a plate body, wherein the plate body is comprised of the fireproof material according to claim 1; and an enamel layer is provided on one side or both sides of the plate body.

6. A fireproof plate comprising a plate body, wherein the plate body is comprised of the fireproof material according to claim 2; and an enamel layer is provided on one side or both sides of the plate body.

7. A fireproof plate comprising a plate body, wherein the plate body is comprised of the fireproof material according to claim 3; and an enamel layer is provided on one side or both sides of the plate body.

8. A fireproof plate comprising a plate body, wherein the plate body is comprised of the fireproof material according to claim 4; and an enamel layer is provided on one side or both sides of the plate body.

9. The fireproof plate according to claim 5, wherein the plate body has a thickness of 5-50 mm; the enamel layer has a thickness of 0.1-5 mm; and the enamel layer is sintered at a temperature of 400-1000° C.

10. The fireproof plate according to claim 6, wherein the plate body has a thickness of 5-50 mm; the enamel layer has a thickness of 0.1-5 mm; and the enamel layer is sintered at a temperature of 400-1000° C.

11. The fireproof plate according to claim 7, wherein the plate body has a thickness of 5-50 mm; the enamel layer has a thickness of 0.1-5 mm; and the enamel layer is sintered at a temperature of 400-1000° C.

12. The fireproof plate according to claim 8, wherein the plate body has a thickness of 5-50 mm; the enamel layer has a thickness of 0.1-5 mm; and the enamel layer is sintered at a temperature of 400-1000° C.

13. The fireproof material according to claim 1, wherein the curing agent is a mixture of lithium oxide and magnesium oxide.

14. The fireproof material according to claim 13, wherein the curing agent is a mixture of the following components in weight ratio based on the total weight of the fireproof material:

1-4 parts of lithium oxide; and
4-6 parts of magnesium oxide.

15. A fireproof wall structure for tunnels, comprising: a wall, the fireproof plate according to claim 4, and a connecting member for fixing the fireproof plate to the wall.

16. The fireproof wall structure for tunnels according to claim 15, wherein the connecting member includes a first connecting portion, a second connecting portion and a third connecting portion that are sequentially coupled, and the first connecting portion, the second connecting portion and the third connecting portion constitute a groove structure; the first connecting portion is fixedly coupled to the fireproof plate, and the third connecting portion is fixedly coupled to the wall; the first connecting portion is provided with a clearance slot, and the third connecting portion is fixedly coupled to the fixing member provided on the wall by the clearance slot.

17. The fireproof wall structure for tunnels according to claim 15, wherein a plurality of adhesives are uniformly distributed between the fireproof plate and the wall.

* * * * *